United States Patent
Gomes et al.

(10) Patent No.: US 10,144,335 B2
(45) Date of Patent: Dec. 4, 2018

(54) SPRING LOADED TIE DOWN ASSEMBLY AND METHOD FOR USE WITH A VEHICLE CARGO AREA

(71) Applicant: JAC Products, Inc., Saline, MI (US)

(72) Inventors: Gerald J. Gomes, Macomb, MI (US); Michael J. Presley, Plymouth, MI (US); Gordon Michie, LaSalle (CA); Benjamin K. Kay, Troy, MI (US)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 15/815,792

(22) Filed: Nov. 17, 2017

(65) Prior Publication Data

US 2018/0141481 A1    May 24, 2018

Related U.S. Application Data

(60) Provisional application No. 62/424,138, filed on Nov. 18, 2016.

(51) Int. Cl.
| | |
|---|---|
| *B60P 7/06* | (2006.01) |
| *B60P 7/08* | (2006.01) |
| *B60P 3/06* | (2006.01) |
| *F16G 11/02* | (2006.01) |
| *F16G 11/12* | (2006.01) |
| *F16B 21/02* | (2006.01) |

(52) U.S. Cl.
CPC ............... *B60P 7/083* (2013.01); *B60P 3/064* (2013.01); *F16G 11/12* (2013.01); *B60P 7/0815* (2013.01); *F16B 21/02* (2013.01)

(58) Field of Classification Search
CPC .. B60P 3/064; B60P 7/083; B60P 7/08; B60P 7/0815; B60P 7/06; F16B 21/02; F16G 11/12
USPC ................ 248/499, 500, 214, 316.1, 229.21; 410/104, 105, 106, 77, 98; 411/81, 85, 411/51, 349
See application file for complete search history.

(56) References Cited

U.S. PATENT DOCUMENTS

| | | | |
|---|---|---|---|
| 3,554,416 A | 1/1971 | Bolt | |
| 4,343,419 A | 8/1982 | Mareydt | |
| 4,372,469 A | 2/1983 | Kowalski et al. | |
| 4,487,348 A | 12/1984 | Mareydt | |
| 4,630,982 A * | 12/1986 | Fenner | B61D 45/001 24/265 CD |
| 4,834,599 A | 5/1989 | Gordon et al. | |
| 5,259,711 A * | 11/1993 | Beck | B60P 7/0815 410/101 |
| 5,370,488 A * | 12/1994 | Sykes | F16B 21/02 411/551 |
| 5,388,744 A | 2/1995 | Glorio et al. | |
| 5,443,190 A | 8/1995 | Cucheran et al. | |

(Continued)

*Primary Examiner* — Tan Le
(74) *Attorney, Agent, or Firm* — Harness, Dickey & Pierce, P.L.C.

(57) ABSTRACT

A tie-down apparatus is disclosed which is adapted to be removably secured over an opening in a structure. The apparatus may have a base plate, a knob, a biasing member, a cam plate and a fastening member. The knob may be used to rotate and depress the cam plate away from the base plate against the biasing force of the biasing member, to permit securing and detachment of the apparatus from the structure. The biasing member maintains the cam plate biased toward the base plate when no pressure is being applied on the knob.

20 Claims, 12 Drawing Sheets

(56) References Cited

U.S. PATENT DOCUMENTS

| | | |
|---|---|---|
| 5,573,161 A | 11/1996 | Stapleton |
| 5,577,650 A | 11/1996 | Stapleton |
| 5,688,087 A | 11/1997 | Stapleton et al. |
| 5,732,863 A | 3/1998 | Stapleton |
| 5,732,864 A | 3/1998 | Stapleton |
| 5,769,292 A | 6/1998 | Cucheran et al. |
| 6,568,644 B2 | 5/2003 | Pedersen |
| 6,585,465 B1 * | 7/2003 | Hammond ............ B60P 7/0815 410/104 |
| 6,722,541 B1 | 4/2004 | Aftanas et al. |
| 6,793,186 B2 | 9/2004 | Pedersen |
| 6,796,471 B2 | 9/2004 | Aftanas et al. |
| 6,811,066 B2 | 11/2004 | Aftanas et al. |
| 6,827,531 B2 * | 12/2004 | Womack ............ B61D 45/001 410/104 |
| 7,156,593 B1 | 1/2007 | Saward et al. |
| 7,273,336 B2 | 9/2007 | Silamianos et al. |
| 7,281,889 B2 * | 10/2007 | Anderson ............ B60P 7/0815 410/102 |
| 7,815,405 B2 | 10/2010 | Aftanas |
| 7,878,743 B2 | 2/2011 | Aftanas |
| 8,657,545 B2 * | 2/2014 | Magno, Jr. ............ F16B 7/187 248/214 |
| 2006/0244279 A1 | 11/2006 | Ranka et al. |
| 2008/0101885 A1 | 5/2008 | Kmita |

\* cited by examiner

SPRING LOADED TIE DOWN ASSEMBLY AND METHOD FOR USE WITH A VEHICLE CARGO AREA

CROSS-REFERENCE TO RELATED APPLICATIONS

This application claims the benefit of U.S. Provisional Application No. 62/424,138, filed on Nov. 18, 2016. The entire disclosure of the above application is incorporated herein by reference.

FIELD

The present disclosure relates generally to tie-down systems used in cargo areas of vehicles such as pickup trucks, SUVs and vans, and more specifically to a spring loaded, easily removable/installable tie-down system which is ideally adapted for use with cargo areas in pickup trucks, SUVs, vans and any other vehicle where cargo needs to be restrained during travel of the vehicle, and where the tie-down system needs to be easily and convenient installable and removable by a user without the need for external tools or complex attachment/detachment procedures.

BACKGROUND

The statements in this section merely provide background information related to the present disclosure and may not constitute prior art.

Tie-down hooks or loops are assemblies that are commonly used in modern vehicles such as pickup trucks, vans and even SUVs. However, tie-down hooks or loops may be subject to failure when subjected to unreasonably high loads. With pickup trucks in particular, different truck bed uses dictate a need for different arrangements or placements of tie-downs, and pickup truck owners may not feel the need to possess a large enough quantity of compatible tie-downs to ensure that all possible locations in their truck bed are equipped with cargo tie-downs components.

Therefore, it is desirable to provide a removable tie-down system that can be quickly and easily installed at one location in a pickup truck bed or other form of cargo area, and just as quickly and easily removed for use when not needed, and further which supports a high capacity load. It is also desirable to provide a tie-down assist system that affords the user the ability to easily and expediently remove a tie-down from the truck bed wall or wall of a cargo area, and reinstall it in another location within the same truck bed or within the same cargo area, or even within a different truck bed or different cargo area.

SUMMARY OF THE INVENTION

In one aspect the present disclosure relates to a tie-down apparatus adapted to be removably secured over an opening in a structure. In one embodiment the apparatus comprises a base plate having a first surface and an opposing second surface. A knob is included which has a pocket. A biasing member is disposed between the first surface of the base plate and the knob, with the biasing member residing at least partially within the pocket. A cam plate is included which has a stud and a camming head portion, the stud engaging with a portion of the base plate. A fastening element is also provided which secures the stud to the knob such that the biasing member is held in a partially compressed position. The biasing member biases the camming head portion in a first direction which tends to clamp the cam plate and the base plate to the structure when the camming head portion and the base plate are disposed on opposite surfaces of the structure. The knob is used to depress the cam plate in a second direction and to rotate the cam plate between first and second orientations. The first orientation enables removal of the apparatus from the structure, and the second orientation causes locking of the apparatus to the structure when the knob is released.

In another aspect the present disclosure relates to a tie-down apparatus adapted to be removably secured over an opening in a structure. The apparatus may comprise a base plate having a first surface, an opposing second surface, and a hole. A knob may be included which has a pocket. A loop element may be included which is coupled to the knob for pivotal movement relative to the knob. A biasing member may be included which is disposed between the first surface of the base plate and the knob, the biasing member residing at least partially within the pocket. A cam plate may be included which has a stud and a camming head portion projecting perpendicularly from the stud, the stud extending through the hole in the base plate. A fastening element may be included for securing the stud to the knob. This causes the biasing member to be held in a partially compressed position and biases the camming head portion in a first direction which tends to clamp the cam plate and base plate to the structure when the camming head portion and the base plate are disposed on opposite surfaces of the structure. The knob is used to depress the cam plate in a second direction and to rotate the cam plate between first and second orientations. The first orientation enables removal of the apparatus from the structure, and the second orientation causes locking of the apparatus to the structure when the knob is released. The loop element may further be placed in a position which prevents the knob from being depressed.

In still another aspect the present disclosure relates to a tie-down apparatus adapted to be removably secured over an opening in a structure. The apparatus may comprise a base plate having a first surface, an opposing second surface and a hole. A knob may be included which has a pocket. A U-shaped loop element may be used coupled to the knob for pivotal movement relative to the knob. A coil spring may be included which is disposed between the first surface of the base plate and the knob. The coil spring may reside at least partially within the pocket. A cam plate may be included which has a stud and a camming head portion projecting perpendicularly from the stud. The stud extends through the hole in the base plate and at least partially through the coil spring. The camming head may have a shape similar to the opening to permit the camming head to be inserted through the opening in only one angular orientation. A fastening element may be included for securing the stud to the knob such that the coil spring is held in a partially compressed position and biases the camming head portion in a first direction. Biasing the camming head portion in a first direction tends to clamp the cam plate and base plate to the structure when the camming head portion and the base plate are disposed on opposite surfaces of the structure. The knob may also be used to depress the cam plate in a second direction against a biasing force of the coil spring and to rotate the cam plate between first and second orientations. The first orientation enables the camming head to be withdrawn through the opening and thus allowing removal of the apparatus from the structure. The second orientation causes locking of the apparatus to the structure when the knob is released. The U-shaped loop element may also be placed in a position which prevents the knob from being depressed.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
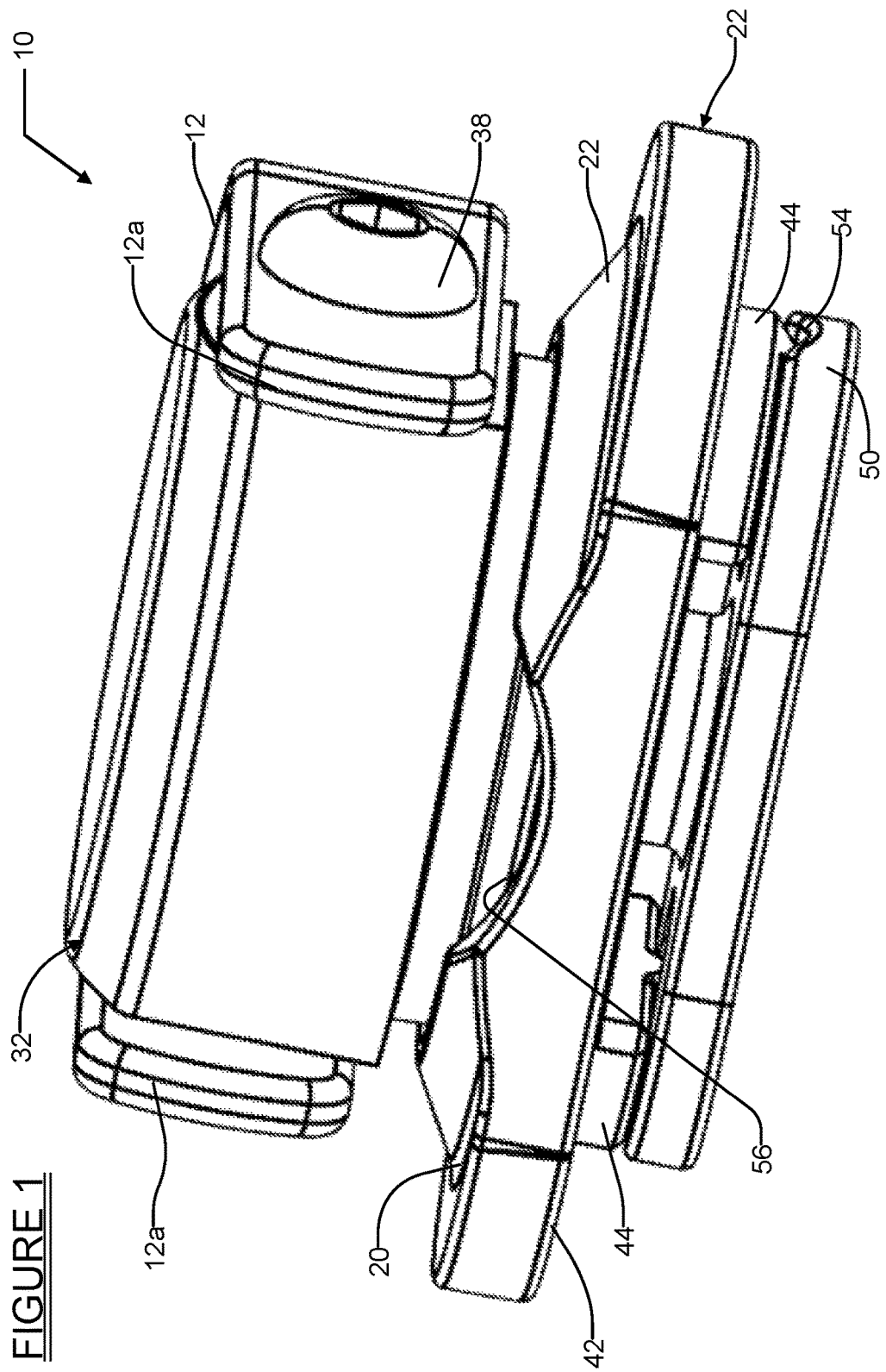
FIG. 1 is a perspective view of one embodiment of a removable tie-down system, according to the present disclosure, showing a rotatable subassembly of the tie-down system in an insert-position.

The following description is merely exemplary in nature and is not intended to limit the present disclosure, application, or uses. It should be understood that throughout the drawings, corresponding reference numerals indicate like or corresponding parts and features.

Referring now to the drawings, one embodiment of a removable tie-down system 10 in accordance with the present disclosure is shown. The system 10 is installable on and removable from a cargo area wall or surface, for example a wall of a pickup truck bed or a wall or fixed structural portion of a cargo area. It should be appreciated that the removable tie-down system is used to secure loads present in a cargo area of a pickup truck, such as a pickup truck bed, or within a cargo area of a SUV or van, or on a flatbed truck, or on virtually any other type of vehicle. The system 10 and the various embodiments discussed herein are not limited to use on motor vehicles but are expected to find utility in any application where it is necessary to secure cargo items against movement using external cables and straps. Such applications may involve applications on watercraft and/or cargo transport aircraft. The system 10 and its various embodiments may even be implemented on existing vehicle roof racks, for example on the cross bars or support rails of existing roof rack or article carrier or restraining systems, with only minor modifications to such systems.

Figure 2:
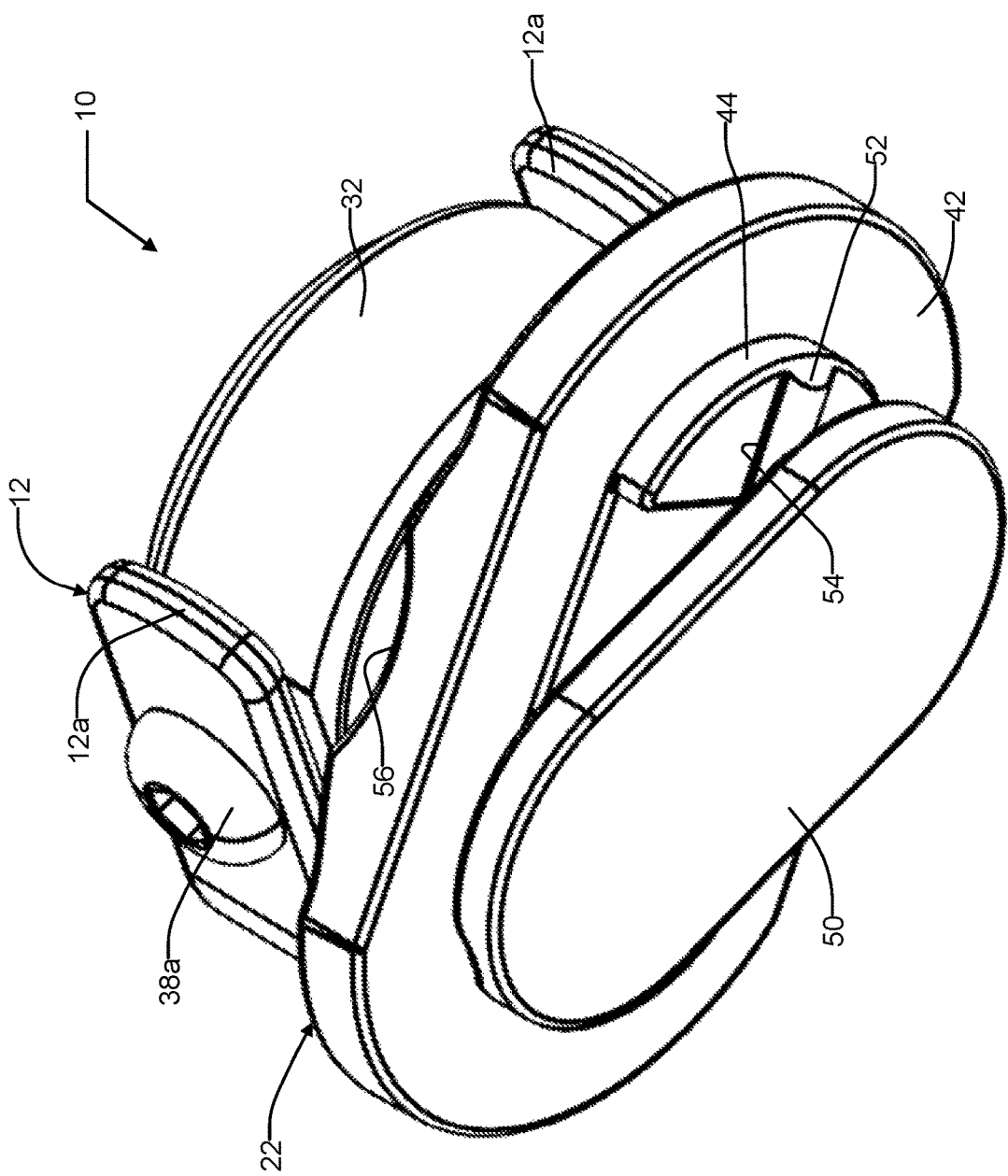
FIG. 2 is a view of the removable tie-down system of FIG. 1 in a mid-articulation position.
Figure 3:
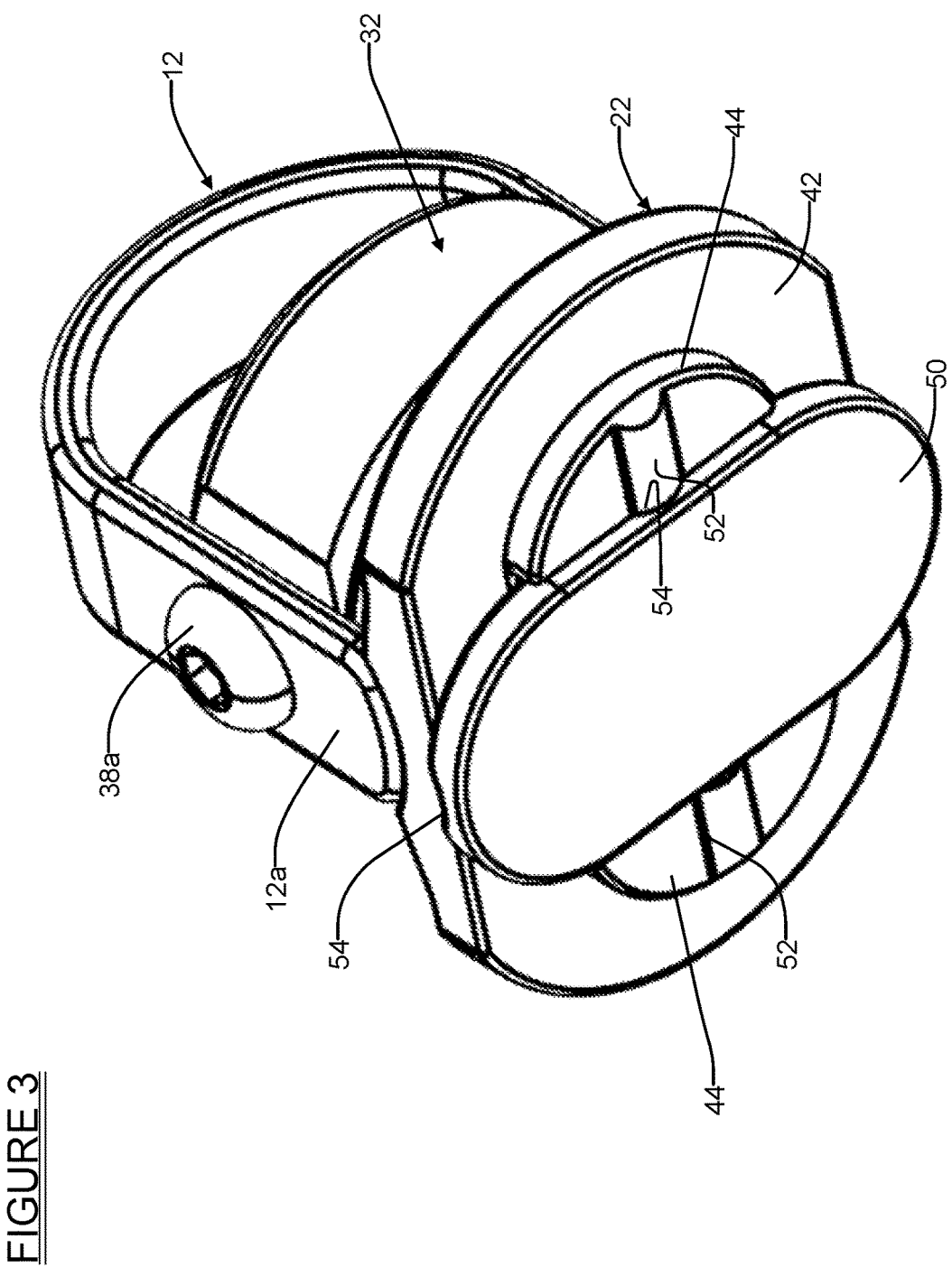
FIG. 3 is another perspective view of the removable tie-down system of FIG. 1 showing the rotatably subsystem illustrated in the locked position.
Figure 4:
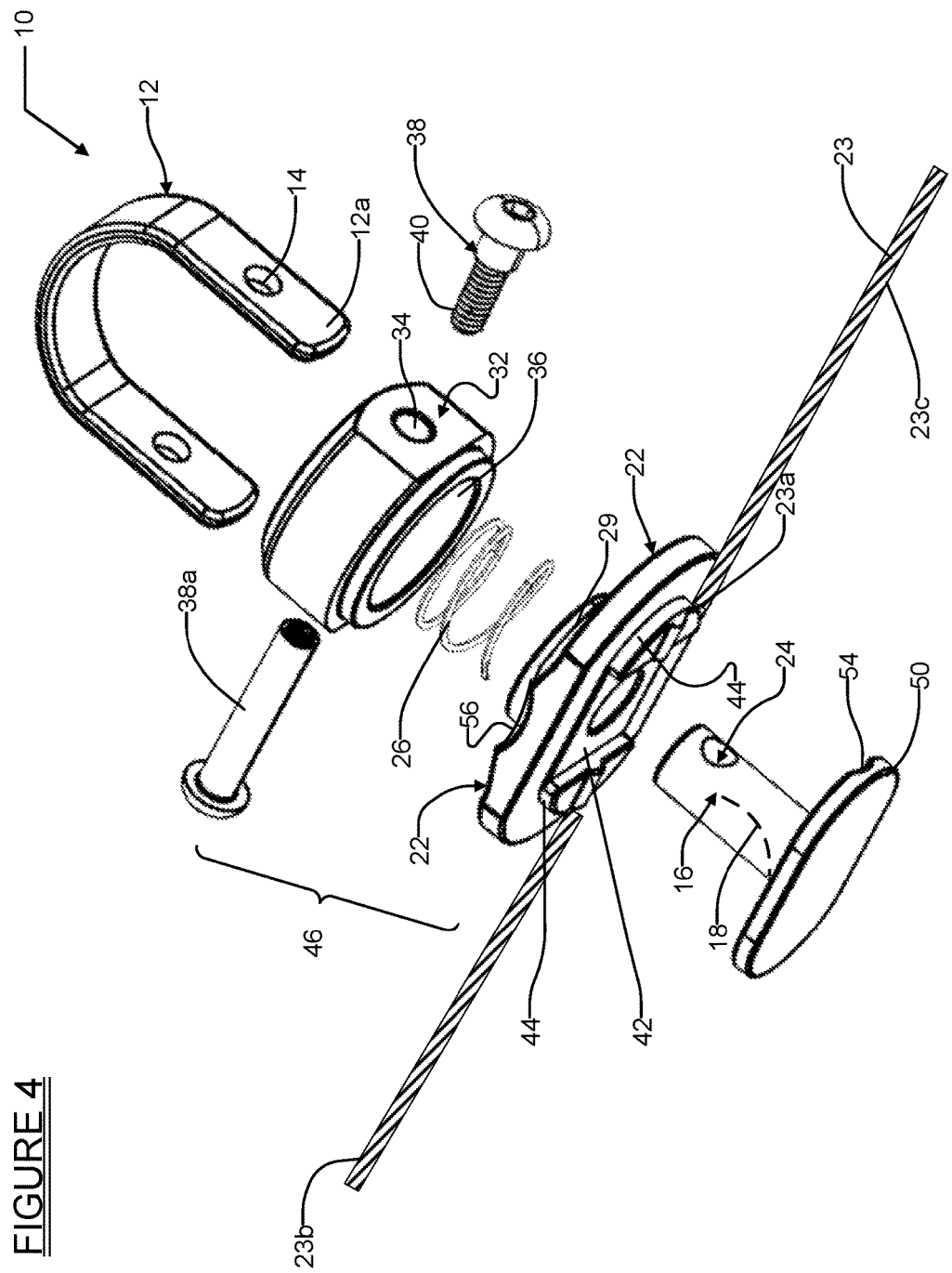
FIG. 4 is an exploded perspective view better illustrating the various components of the removable tie-down system of FIG. 1.

Referring to FIGS. 1 through 11, and more specifically FIG. 4, the removable tie-down system includes an exposed loop element 12 (hereinafter simply "loop" 12). The loop 12 may comprise a rigid component, such as a steel stamped part, with two generally parallel and congruent through-holes 14 (FIG. 4) on each of its ends. One holes 14 is tapped to include a female thread, while the other is a slightly oversized, unthreaded through hole. The tie-down system 10 also includes a cam plate 16, which may be made from metal, aluminum or another suitable strong material. The cam plate 16 may include a cylindrical stud 18 emerging at a normal orientation from a top or front surface 20 of a decorative base-plate 22. The stud 18 includes a circular through hole 24 near one of its ends, and opposite the end which has a camming head portion 50.

The base-plate 22 of the system 10 serves as a reaction surface for a spring 26 and for a mating surface 23 of a truck bed sidewall, or wall of a cargo area, or a fixedly structural component. For convenience, surface 23 will be referred to in the following discussion simply as a truck bed sidewall, while it is understood that the surface need not necessarily be a pickup truck bed sidewall.

Figure 5:
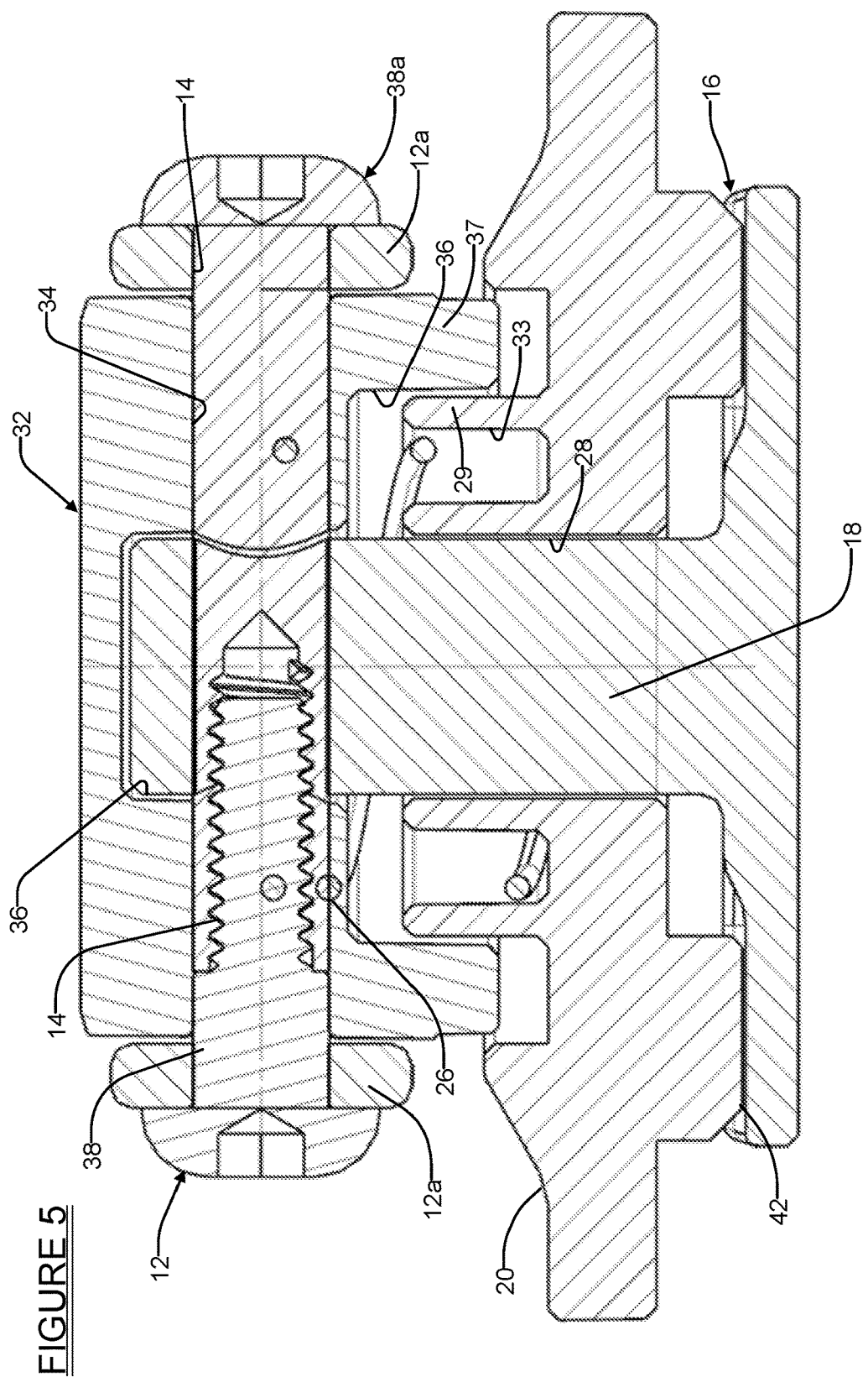
FIG. 5 is a section through the center of the removable tie-down of FIG. 1 with the system locked but not tightened, and with the section orientation parallel to the center axis of the dowel pin.
Figure 6:
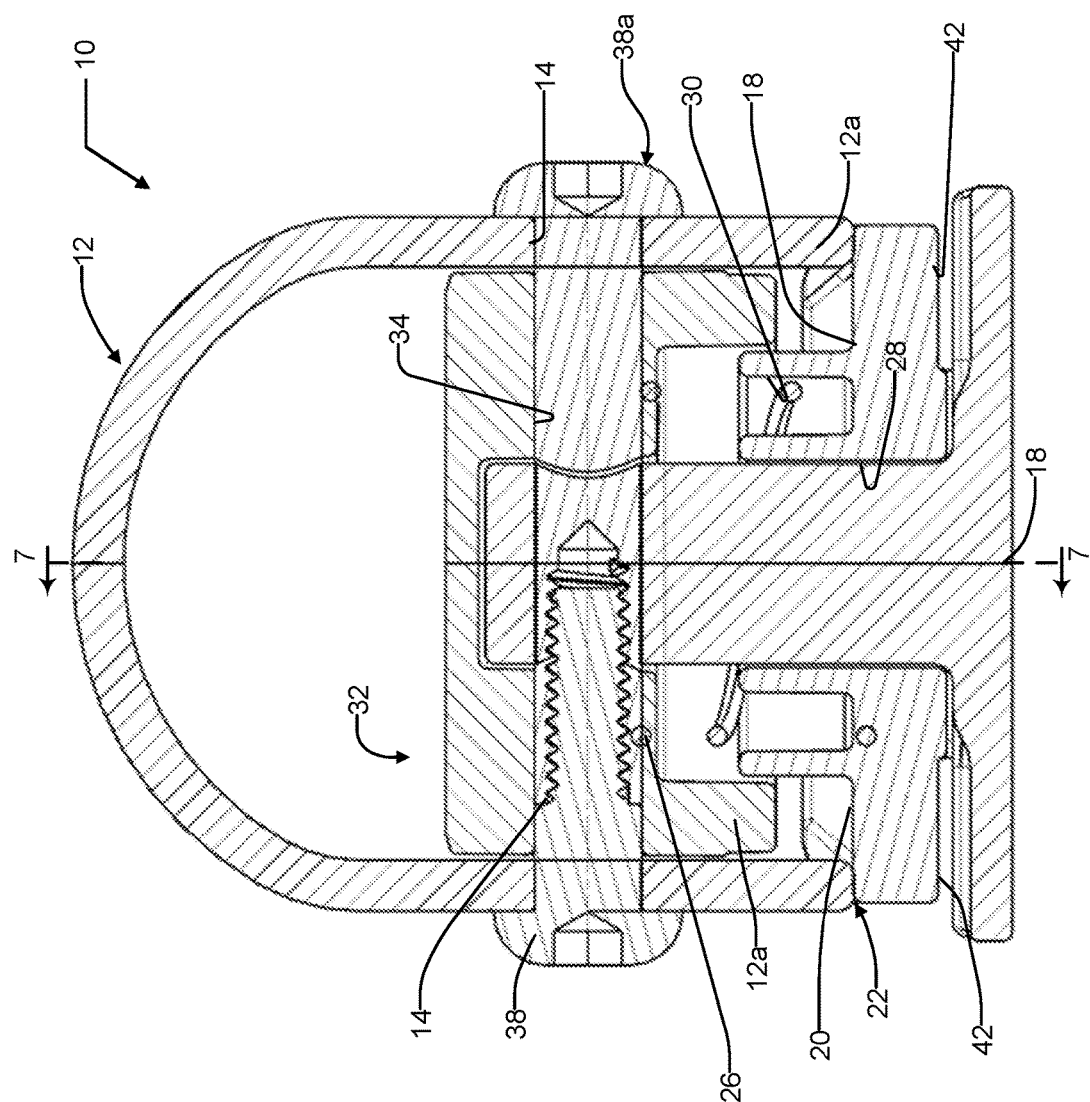
FIG. 6 is a section through the center of the removable tie-down of FIG. 1, with the system locked and tightened, and with the section orientation parallel to the center axis of the dowel pin.
Figure 7:
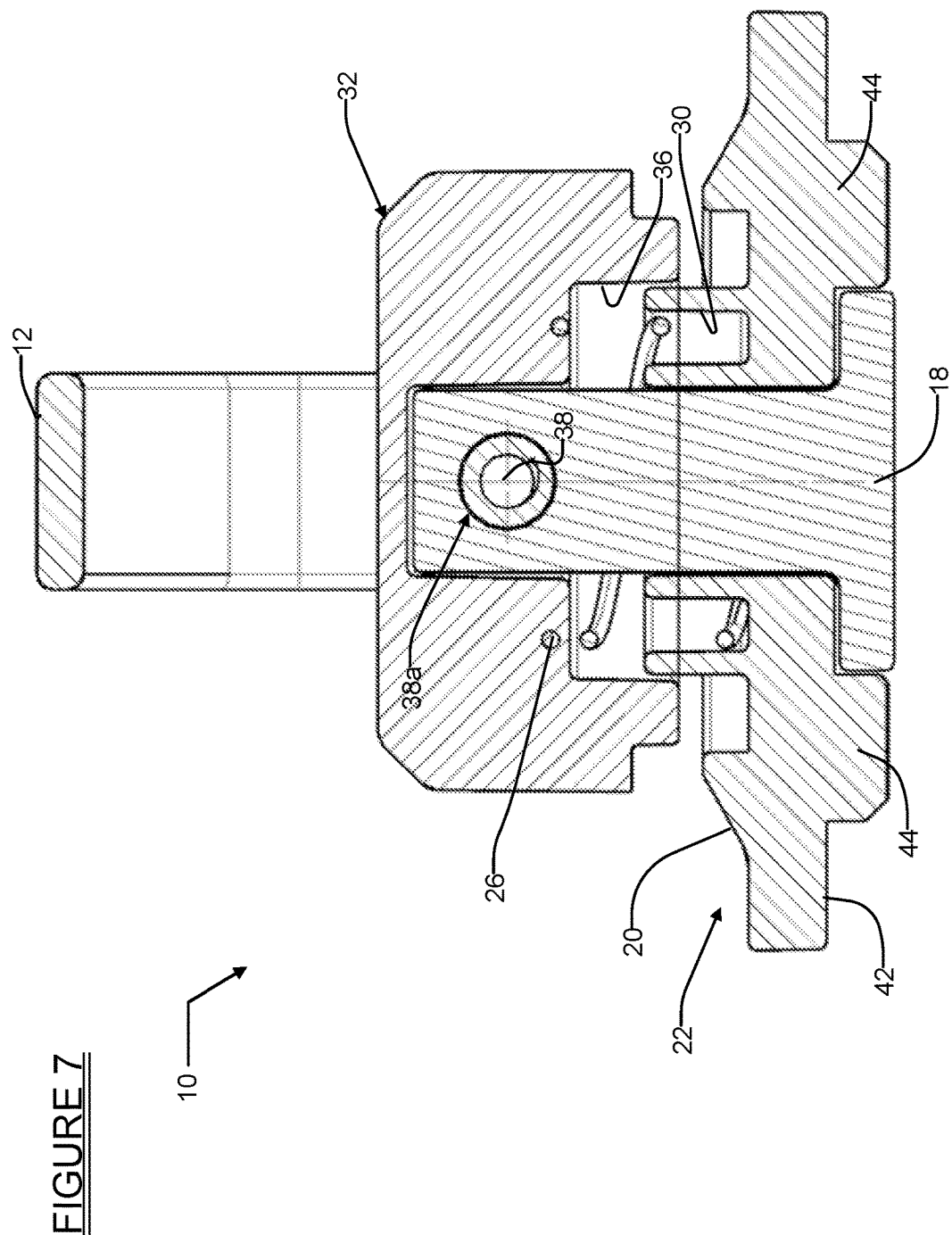
FIG. 7 is a section through the center of the removable tie-down of FIG. 1 with the system in the locked position, and with the section orientation perpendicular to the center axis of the dowel pin.
Figure 8:
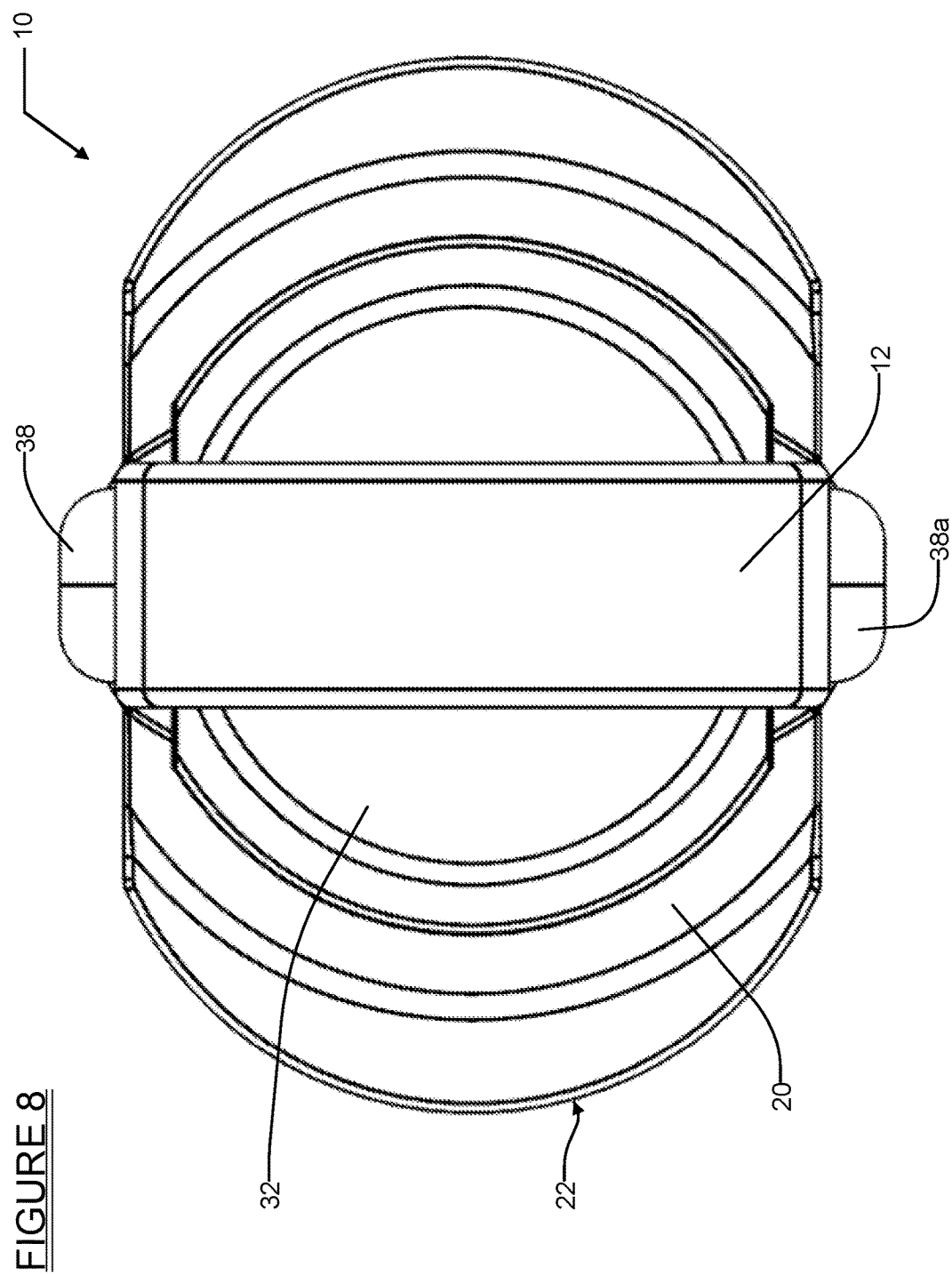
FIG. 8 is a top end view of the removable tie-down system of FIG. 1 in the locked position.

Referring to FIG. 5, the stud 18 present on the cam plate 16 is inserted into a through hole 28 in the center of the base-plate 22. The spring 26 is placed into a cylindrical pocket 30 formed by a projecting wall 29 on the base-plate 22. The loop 12 is placed around a knob 32 with the through-holes 14 in the loop 12 aligned with a bore 34 in the knob 32. The loop 12 and knob 32 are fit over the cam's stud 18, with the end of the stud fitting into a cylindrical pocket 36 formed by a wall 37 on the knob 32 such that the spring 26 is trapped between the base-plate 22 and the knob 32. A fastening element, for example a dowel pin 38, is inserted through the aligned through hole 24 in the stud 18, through the bore 34 in the knob 32, and through the holes 14 in the loop 12. A leading end 40 of the dowel pin 38 may have a male thread that matches a female thread present in an internal bore of a barrel nut 38a, or alternatively one of the holes 14 of the loop 12 may have an internal thread. The threads of the dowel pin 38 may also be coated with a thread locking agent that prevent rotation and/or removal of the dowel pin 38 once the system 10 has been fully assembled.

Figure 9:
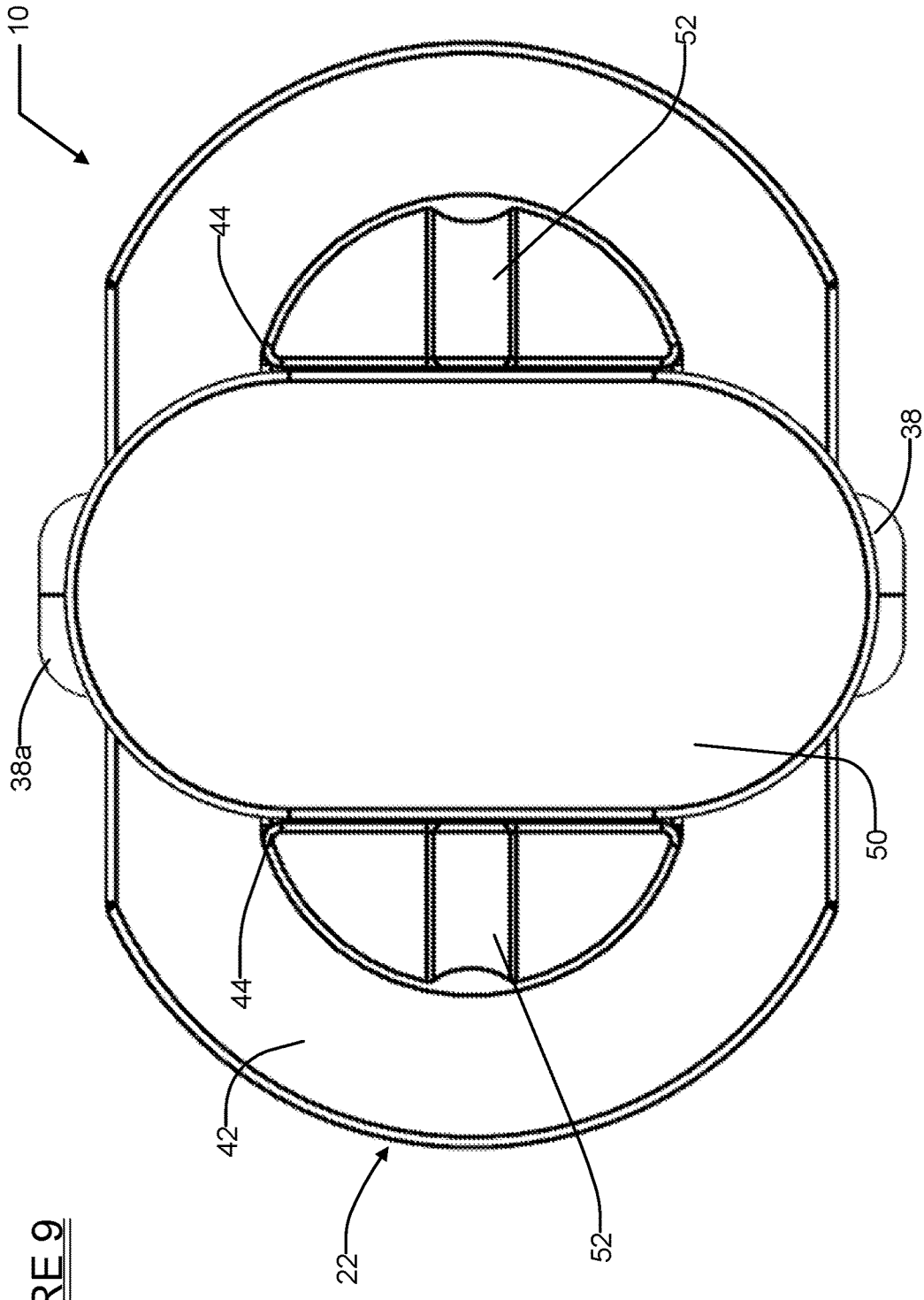
FIG. 9 is a bottom end view of the removable tie-down system of FIG. 1 in the locked position.
Figure 10:
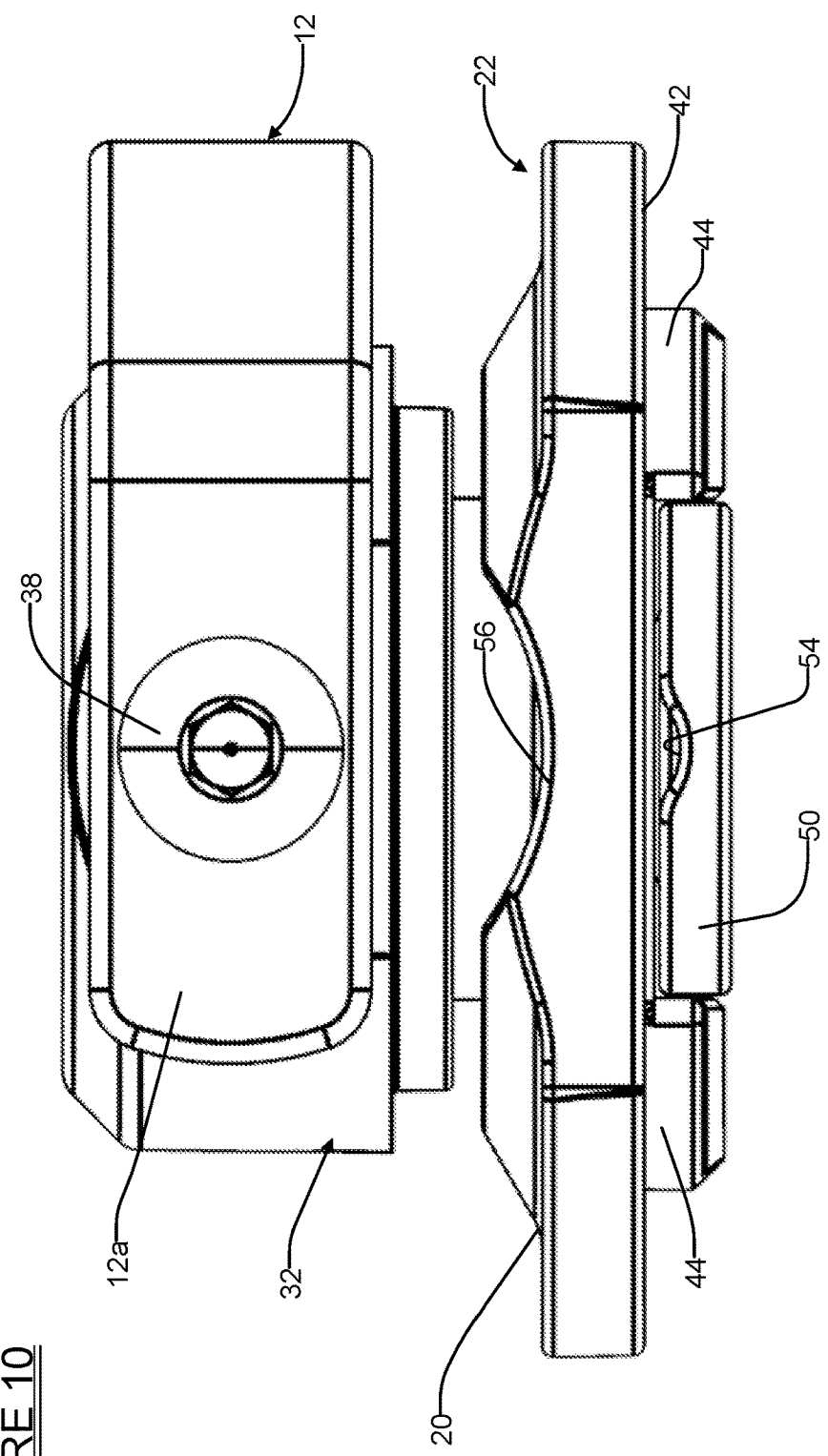
FIG. 10 is a side view of the removable tie-down system of FIG. 1 in the locked position, but not tightened.
Figure 11:
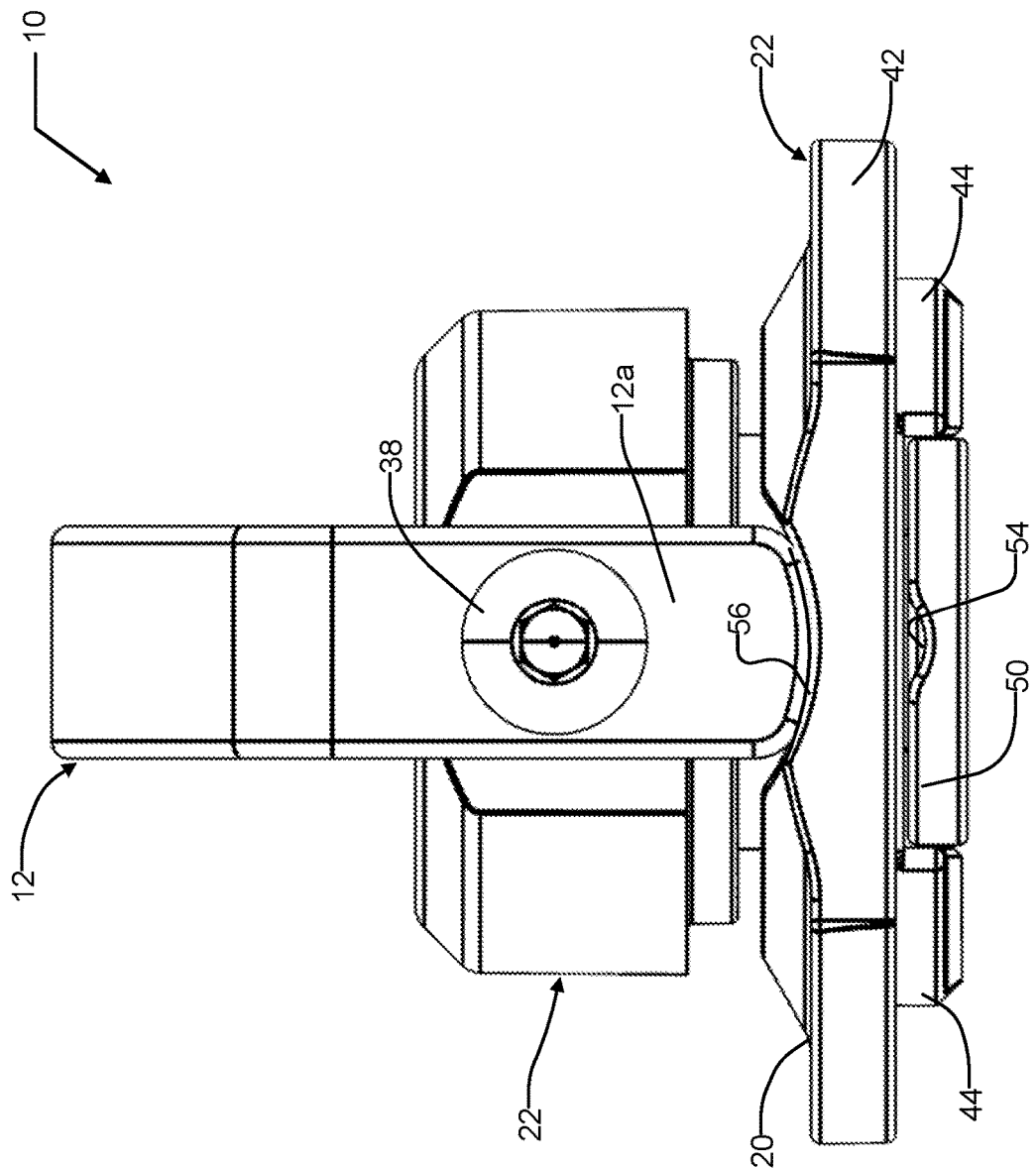
FIG. 11 is a side view of the removable tie-down system of FIG. 1 in the locked and tightened position.

With further reference to FIG. 9, an opposite (or "second") side 42 of the base-plate 22 includes two stop-travel features 44 that are symmetrical to each other about a center-line of the through hole 28. The spring 26 is slightly compressed once assembled. One end of the spring 26 reacts against the front (i.e., "first") surface 20 of the base-plate 22, while the other end of the spring reacts against an inner surface of the pocket 36 of the knob 32. In this manner the spring 26 biases the knob 32, and therefore the loop 12 and dowel pin 38, away from the base-plate 22 front surface 20, and in effect pulls the cam plate 16 against the second side 42 of the base-plate 22 with a force determined by the spring-rate of the coil spring 26. Collectively the cam plate 16, spring 26, and knob 32 may be viewed as a camming subsystem 46.

With further reference to FIG. 4 the camming head portion 50 is fixedly secured to the stud 18 or alternatively may form an integral portion of the stud 18. The bed sidewall 23 includes an opening 23a which may be shaped generally in accordance with the camming head portion 50 so that the camming head portion can only be inserted in one orientation through the opening 23a, or otherwise can be rotated into some orientation so that it cannot be removed from the opening 23a.

With further reference to FIG. 4, in order to attach the system 10 to the bed sidewall 23, the user initially places the base-plate 22 against an outer surface 23b of the bed sidewall 23 so that camming head portion 50 is orientated to be able to pass through the opening 23a. With the system 10 held in this orientation the user pushes the knob 32 toward the bed sidewall 23 so that the camming head portion 50, along with the stop travel features 44, pass through the opening 23a. During this motion the projecting wall 29 will move further into the cylindrical pocket 36 within the wall portion 37. In this regard it will be appreciated that the outer shape of the stop travel features 44 is similar to that of the camming head portion 50, which allows the stop travel features to pass through the opening 23a. While holding the knob 32 pushed in, the user then turns the knob 32 to rotate the knob and its attached loop 12 a predetermined amount, for example ninety degrees (as shown in FIG. 9). The ninety degree rotation is merely one example, and the system 10 could be designed to implement a greater or lesser degree of rotation. In either event, the rotational movement of the knob 32 places the camming head portion 50 at an angle, in this example normal, to the opening 23a so that the system 10 cannot be removed from the bed sidewall 23. When the user then releases pressure on the knob 32 the spring 26 biases the cam plate 16 against an inside surface 23c of the bed sidewall 23 which pulls the camming head portion 50 into contact with the inside surface 23c of the bed sidewall 23. This effectively clamps portions of the bed sidewall 23 between portions of the camming head portion 50 and the second surface 42 of the base-plate 22. The camming head portion 50 will further be captured between the stop travel features 44, which prevent any rotation of the camming head portion 50 regardless of the load being placed on the loop 12. When the loop 12 is flipped up into the position shown in FIGS. 3, 6 and 11, distal portions 12a of the loop, which may have a slightly arcuate shape, engage within complementary shaped recesses 56 in the front surface 20 of the base-plate 22. This prevents the knob 32 from being pressed inwardly toward the base-plate 22, and thus eliminates any possibility of the system 10 being accidentally disengaged from the sidewall 23 if some external item should fall against, or press against, the knob 32.

With further brief reference to FIGS. 3 and 9, it will be appreciated that the stop travel features 44 may each include aligned ribs 52 (FIG. 9), and the camming head portion 50 may include an elongated recess 54 (FIG. 3). The elongated recess 54 and the aligned ribs 52 cooperate to help key the camming head portion 50 into an orientation to enable removal or insertion through the opening 23a in the bed sidewall 23.

Referring now to FIGS. 1, 2, and 3, the system 10 is shown in its three primary orientations: ready for installation (FIG. 1), mid-articulation (FIG. 2), and fully locked (FIG. 3). The cam plate 16 is preferably shaped identical to the opening 23a but is just slightly smaller than the opening. In this example the opening 23a forms an oblong hole, although an opening having a different shape could be used provided the camming head portion 50 has the same shape. The camming head portion 50 has overall dimensions which enable it to pass freely through the opening 23a in the bed sidewall 23. The stop travel features 44 present on the second surface 42 of the base-plate 22 are preferably dimensioned to fit tightly into the opening 23a in the sidewall such that the base-plate 22 cannot rotate once the system 10 has been inserted into the opening 23a in the bed sidewall 23.

When the user needs to remove the system 10 from the bed sidewall 23, the user pivots the loop 12 back into the position shown in FIGS. 1 and 2. The user then pushes the knob 32 toward the base-plate 22, overcoming the biasing force of the spring 26, which again frees the cam plate 16 and its camming head portion 50 to turn past the stop travel features 44 (FIG. 2) into the position shown in FIG. 1. The knob 32, and therefore the camming head portion 50, are turned 90 degrees while holding the knob 32 depressed. When the camming head portion 50 is in the position shown in FIG. 1, the pressure on the knob 32 can be removed and the entire system 10 can be pulled away from the bed sidewall 23.

The loop 12 may be designed to interface with "S" shaped hooks or any other shaped fastening components that are commonly found on most cargo management straps. If an S-shaped hook is used, then the hook will interfere with the knob 32 when the user attempts to rotate the loop 12 about the dowel pin 38, therefore preventing the loop 12 from being rotated out of the safely locked position. Performing this installation operation in reverse, which includes turning the loop by a predetermined rotational amount about the dowel pin 38, pushing in the knob 32, turning the knob 32 by the same predetermined rotational amount, and releasing the knob 32 so that the spring 26 relaxes, will allow the system 10 to simply be pulled from the sidewall for storage or relocation to another location in the pickup bed. The predetermined rotational amount may vary depending on design considerations but in one example it may be ninety degrees.

The longitudinal travel of the knob 32 is selected taking into consideration the thickness of the bed sidewall 23 so that when the knob 32 is completely released, the spring 26 will still be under compression and exerting a biasing force on the head portion 50, and therefore helping to keep the head portion 50 and base-plate 22 clamped to the bed sidewall 23. This length of travel of the knob 32 may need lengthened or shortened slightly depending on the thickness of the panel that the system 10 is being clamped to.

It will be appreciated then that the system 10 can be used in multiple locations of any form of truck bed sidewall, cargo wall, or any other fixed element having a panel-like construction, where it is desirable to be able to secure a cargo strap thereto. Since the system 10 is quickly and easily removable and attachable without the need for any external tools, the system 10 can be easily repositioned at various locations within a cargo area wherever a suitable opening (such as opening 23a) is present for use. The system 10 is also not limited to use with only one particular vehicle. For example, the system 10 could be used in the bed of a pickup truck and then removed therefrom and used in a cargo area of an SUV or van, assuming the SUV or van included suitably shaped openings (such as openings 23a) as attachment points.

It is still another advantage of the system 10 that little or no modification of the bed sidewall is needed. It is sufficient simply to provide an opening that is shaped in accordance with the shape and dimensions of the head portion 50 and the overall shape of the stop travel features 44, and preferably just slightly larger than the head portion 50.

Figure 12:
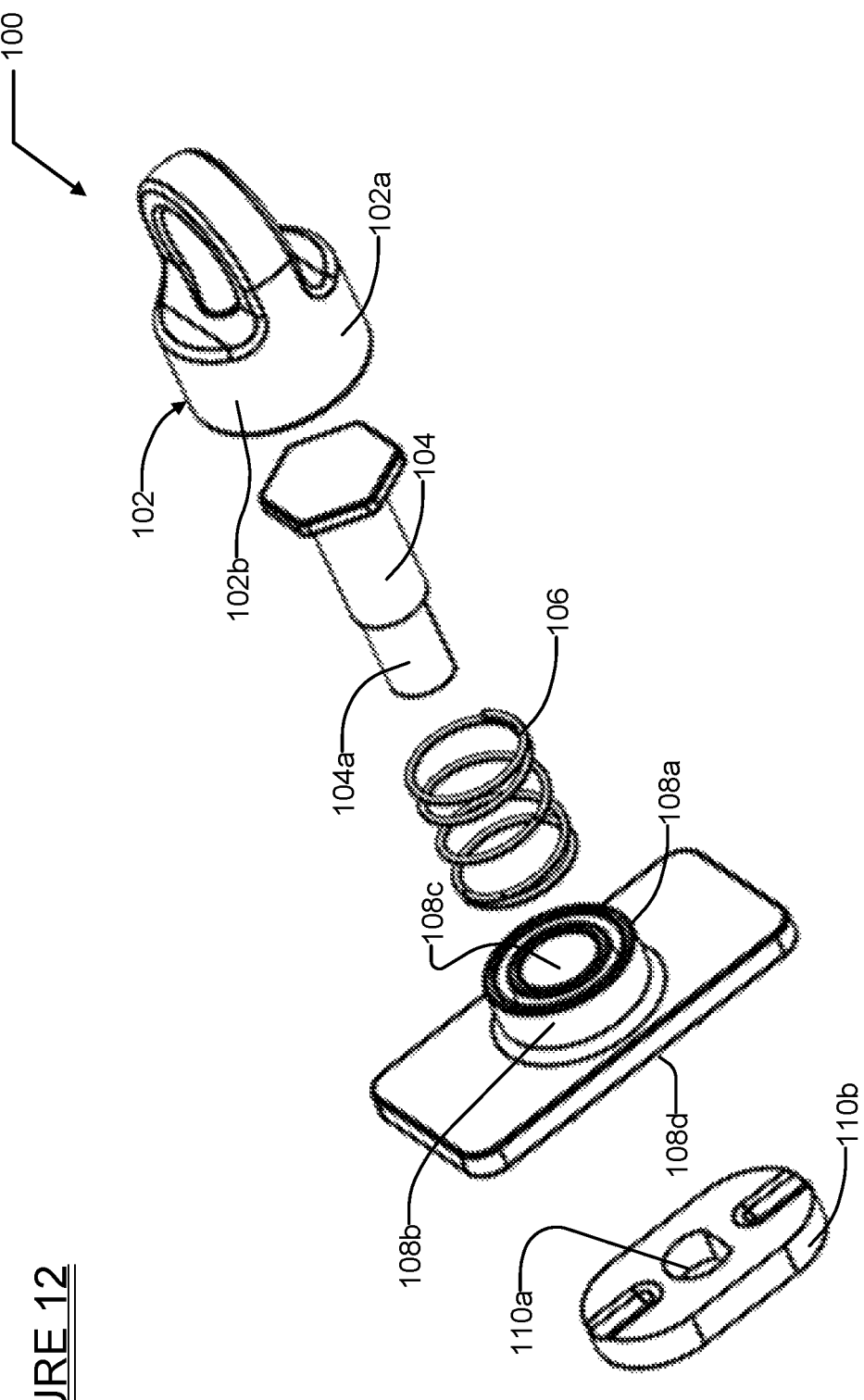
FIG. 12 is an exploded perspective view of a removable tie-down system in accordance with another embodiment of the present disclosure.

Referring to FIG. 12, another tie down system 100 is shown in accordance with another embodiment of the present disclosure. The system 100 is similar to system 10 in that it uses a loop element 102, a stud 104, a spring 106, a base-plate 108 and a cam element 110. The stud 104 may be inserted molded into a base section 102a of the loop element 102 so that it is not rotatable relative to the loop element. The loop element includes a recess 102b into which a portion of the spring 106 is inserted when the system 100 is fully assembled. An opposite end of the spring 106 may rest in a circumferential channel 108a of a boss portion 108b of the base-plate 108. A shaft portion 104a of the stud 104 projects through an opening 108c of the boss portion 108b and is engaged within an opening 110a of the cam element 110. The shaft end 104a may be orbit formed so that it can be secured to the cam element 110 once fully inserted through the opening 110a, and thus will effectively be keyed to the stud 104 and will rotate with stud 104. Optionally, a press fit connection can be used to secure the cam element made the opening 108c or a threaded connection may be used to secure these two components together, together with a suitable adhesive or other element which fixes the cam element 110 and the stud 104 together so that one cannot rotate independently of the other.

The cam element 110 may include stop travel features (not visible in FIG. 12) which are shaped similar or identical to stop travel features 44 of the system 10. The cam element 110 may likewise include a groove 110b which cooperates with a rib-like feature (not visible in FIG. 12) on a lower surface 108d of the base-plate 108 (similar or identical to rib 52) to help "key" the cam element 110 into an orientation where it may be inserted into or removed from the opening 23a. When fully assembled the spring 106 is trapped between the base-plate 108 and the loop element 102, and is substantially or entirely hidden within the recess 102b in the loop element 102. The spring 106 biases the cam element 110 into contact with the lower surface 108d of the base-plate 108.

In operation the system 100 operates much like the system 10. The user positions the base-plate over the opening 23a so that the cam element 110 is oriented to be insertable through the opening 23a. The user then inserts the cam element 110 and the stop features through the opening 23a. The lower surface 108d will then be resting against the outer surface 23b of the bed sidewall. The user then pushes on the loop element 102 and while holding the loop element 102 depressed, rotates it about ninety degrees so that the cam element 110 is positioned between the stop travel features. The user then releases the loop element 102 and the spring 106 biases the cam element into contact with the inside surface 23c of the bed sidewall 23, effectively clamping the base-plate 108 to the bed sidewall 23. Removal of the system 100 is accomplished by reversing the order of the above described steps.

While various components of the above-described embodiments have been mentioned as being made from specific materials, for example the loop 12 being made from metal, it will be appreciated that other suitably strong materials (e.g., high strength plastic) may be used to construct the various components of each of the above-described embodiments. Therefore, the components of each of the embodiments are not limited to use with only one specific type of material. Furthermore, it will be understood that certain components may be readily interchanged with other types of components to perform a common function without departing from the teachings herein. For example, the dowel pin 38 could readily be formed by a threaded screw or possibly even a press fit pin.

While the various embodiments described herein have been described as being well suited for use in a pickup truck bed, it will be appreciated that the various embodiments could be used on virtually any interior or exterior area of a vehicle where there is a need for a tie-down system. It is expected that the various embodiments described herein may also find utility in non-vehicle applications where items need to be temporarily secured against movement, and possibly also in connection with other article carrier components such as with cross bars or support rails of existing article carrier systems used on motor vehicles.

The various embodiments described herein could also incorporate a suitable anti-theft mechanism which prevents removal of the system from a wall that it is secured to without first unlocking the system via a key.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A tie-down apparatus adapted to be removably secured over an opening in a structure, the apparatus comprising:
   a base plate having a first surface and an opposing second surface;
   a knob having a pocket;
   a biasing member disposed between the first surface of the base plate and the knob, the biasing member residing at least partially within the pocket;
   a cam plate having a stud and a camming head portion, the stud engaging with a portion of the base plate;
   a fastening element for securing the stud to the knob such that the biasing member is held in a partially compressed position and biases the camming head portion in a first direction which tends to clamp the cam plate and base plate to the structure when the camming head portion and the base plate are disposed on opposite surfaces of the structure, and further such that the knob is used to depress the cam plate in a second direction and to rotate the cam plate between first and second orientations, the first orientation enabling removal of the apparatus from the structure, and the second orientation causing locking of the apparatus to the structure when the knob is released.

2. The apparatus of claim 1, further comprising a loop pivotally coupled to the knob, the loop being movable from a first position where the knob may be depressed a first distance into contact with the first surface of the base plate, and into a second position where the loop interferes with depressing the knob to prevent depressing the knob.

3. The apparatus of claim 2, wherein the loop comprises a U-shape, and wherein end portions of the loop contact the first surface of the base plate when the loop is moved into the second position.

4. The apparatus of claim 3, wherein the end portions of the loop each have an arcuate shape, and wherein the first surface of the base plate includes a pair of complementary shaped recesses that engage the arcuate shape of each said end portion to help maintain the loop in the second position once pressure on the knob is released.

5. The apparatus of claim 1, wherein the biasing member comprises a coil spring.

6. The apparatus of claim 1, wherein the base plate includes a pocket in which a portion of the biasing member is positioned.

7. The apparatus of claim 1, wherein the second surface of the base plate includes at least one stop travel feature for engaging with the camming head portion of the cam plate to hold the cam plate in the second orientation and to prevent rotation of the cam plate when the knob is not being depressed.

8. The apparatus of claim 1, wherein the cam plate has an elongated recess on a first surface thereof, and wherein the base plate has a plurality of aligned ribs which are received in the elongated recess when the cam plate is rotated into the first orientation and pressure on the knob is released; and
wherein the engagement of the aligned ribs and the elongated recess prevent rotation help to maintain the cam plate in the first orientation during removal of the apparatus from the structure.

9. The apparatus of claim 1, wherein the portion of the base plate comprises a hole, and wherein the stud projects through the hole.

10. A tie-down apparatus adapted to be removably secured over an opening in a structure, the apparatus comprising:
a base plate having a first surface, an opposing second surface, and a hole;
a knob having a pocket;
a loop element coupled to the knob for pivotal movement relative to the knob;
a biasing member disposed between the first surface of the base plate and the knob, the biasing member residing at least partially within the pocket;
a cam plate having a stud and a camming head portion projecting perpendicularly from the stud, the stud extending through the hole in the base plate;
a fastening element for securing the stud to the knob such that the biasing member is held in a partially compressed position and biases the camming head portion in a first direction which tends to clamp the cam plate and base plate to the structure when the camming head portion and the base plate are disposed on opposite surfaces of the structure, and further such that the knob is used to depress the cam plate in a second direction and to rotate the cam plate between first and second orientations, the first orientation enabling removal of the apparatus from the structure, and the second orientation causing locking of the apparatus to the structure when the knob is released; and
wherein the loop element may be placed in a position which prevents the knob from being depressed.

11. The apparatus of claim 10, wherein the loop element comprises a U-shape and includes a pair of end portions.

12. The apparatus of claim 11, wherein the end portions of the loop are oriented to permit depressing the knob when the loop is positioned in a first position, and when the end portions of the loop are in a second position the end portions engage the first surface of the base plate and prevent the knob from being depressed.

13. The apparatus of claim 10, wherein the second surface of the base plate includes a pair of spaced apart stop travel features for engaging with the camming head portion of the cam plate to hold the cam plate in the second orientation and to prevent rotation of the cam plate when the knob is not being depressed.

14. The apparatus of claim 13, wherein the camming head portion includes an elongated recess, and wherein the stop travel features include aligned ribs, the aligned ribs engaging with the elongated recess when the cam plate is rotated into a position permitting removal from the structure.

15. The apparatus of claim 13, wherein the biasing member comprises a coil spring positioned over a portion of stud.

16. The apparatus of claim 15, wherein a portion of the coil spring is captured within a projecting wall portion of the base plate.

17. A tie-down apparatus adapted to be removably secured over an opening in a structure, the apparatus comprising:
a base plate having a first surface, an opposing second surface, and a hole;
a knob having a pocket;
a U-shaped loop element coupled to the knob for pivotal movement relative to the knob;
a coil spring disposed between the first surface of the base plate and the knob, the coil spring residing at least partially within the pocket;
a cam plate having a stud and a camming head portion projecting perpendicularly from the stud, the stud extending through the hole in the base plate and at least partially through the coil spring;
the camming head have a shape similar to the opening to permit the camming head to be inserted through the opening in only one angular orientation;
a fastening element for securing the stud to the knob such that the coil spring is held in a partially compressed position and biases the camming head portion in a first direction which tends to clamp the cam plate and base plate to the structure when the camming head portion and the base plate are disposed on opposite surfaces of the structure, and further such that the knob is used to depress the cam plate in a second direction against a biasing force of the coil spring and to rotate the cam plate between first and second orientations, the first orientation enabling the camming head to be withdrawn through the opening and thus removal of the apparatus from the structure, and the second orientation causing locking of the apparatus to the structure when the knob is released; and
wherein the U-shaped loop element may be placed in a position which prevents the knob from being depressed.

18. The apparatus of claim 17, wherein the U-shaped loop element includes a pair of end portions that engage the first surface of the base plate when the U-shaped loop element is moved from a first position into a second position, and thus prevent depressing the knob; and
wherein in the first position, the loop element is orientated to allow depressing the knob.

19. The apparatus of claim 17, wherein the base plate includes a projecting wall within which a portion of the coil spring is positioned.

20. The apparatus of claim 19, wherein the projecting wall is positioned within a portion of the pocket when the apparatus is assembled.

* * * * *